United States Patent
Finch et al.

(10) Patent No.: US 10,221,257 B2
(45) Date of Patent: Mar. 5, 2019

(54) POLYMER WITH RELEASABLE GAS

(71) Applicant: Rohm and Haas Company, Philadelphia, PA (US)

(72) Inventors: John David Finch, North Wales, PA (US); Andrew M. Savo, Cherry Hill, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/503,516

(22) PCT Filed: Aug. 12, 2015

(86) PCT No.: PCT/US2015/044766
§ 371 (c)(1),
(2) Date: Feb. 13, 2017

(87) PCT Pub. No.: WO2016/025550
PCT Pub. Date: Feb. 18, 2016

(65) Prior Publication Data
US 2017/0226239 A1 Aug. 10, 2017

Related U.S. Application Data

(60) Provisional application No. 62/037,337, filed on Aug. 14, 2014.

(51) Int. Cl.
*C08F 8/30* (2006.01)
*B01J 39/20* (2006.01)
*C08F 112/08* (2006.01)

(52) U.S. Cl.
CPC ............... *C08F 8/30* (2013.01); *B01J 39/20* (2013.01); *C08F 112/08* (2013.01)

(58) Field of Classification Search
CPC ..... A61L 2300/114; B01J 39/20; B01J 41/14; C08J 2309/06
See application file for complete search history.

(56) References Cited

U.S. PATENT DOCUMENTS

| | | |
|---|---|---|
| 4,444,961 A | 4/1984 | Timm |
| 4,623,706 A | 11/1986 | Timm et al. |
| 5,459,211 A | 10/1995 | Martin et al. |
| 6,323,249 B1 | 11/2001 | Dale et al. |
| 6,737,488 B2 | 5/2004 | Vanhoorne et al. |
| 6,770,222 B1 | 8/2004 | Ukita et al. |
| 2002/0195392 A1 | 12/2002 | Schmid et al. |
| 2007/0196327 A1 | 8/2007 | Kalivretenos et al. |
| 2008/0096987 A1 | 4/2008 | Podszun et al. |
| 2010/0041828 A1 | 2/2010 | Kato et al. |
| 2010/0255062 A1* | 10/2010 | Kalivretenos ........ A61K 31/785 424/440 |
| 2014/0056957 A1 | 2/2014 | Chen et al. |

FOREIGN PATENT DOCUMENTS

| | | |
|---|---|---|
| EP | 0928296 B1 | 12/2001 |
| GB | 1 526 971 A | 10/1978 |
| JP | 2004-250630 A | 9/2004 |
| JP | 2006-285056 A | 10/2006 |

OTHER PUBLICATIONS

Bortel, et al., "Free radical polymerization in aqueous solution of acrylic acid mediated by nitroxides originated from NaNO2", J. Macromolecular Science, Pure and Applied Chemistry (1998), A35(2), pp. 401-409.
Detrembleur, "Sodium Nitrite and ascorbic acid: a metal-free combination that controls the free-radical Polymerization of tert-butyl methacrylate in water", e-Polymers, 2002, No. 004, p. 1-16.
Detrembleur, "Comments on and Updating of the Paper 'Controlled Radical Polymerization of Methyl Methacrylate Mediated by 4-Methoxypyridine-N-oxide'", Macromolecules, vol. 34, pp. 5744-5745, 2001.
Detrembleur, et al., "Controlled radical polymerization of alkyl methacrylates in the presence of NO/NO2 mixtures", ACS Symposium Series (2003), 854(Advances in Controlled/Living Radical Polymerization), pp. 496-518.
Detrembleur, et al., "Control of the Radical Polymerization of tert-Butyl Methacrylate in Water by a Novel Combination of Sodium Nitrite and Iron(II) Sulfate", Macromolecules (2002), 35(5), pp. 1611-1621.
Hawker, et al., "Initiating systems for nitroxide-mediated "living" free radical polymerizations: Synthesis and evaluation", Macromolecules, vol. 29, Issue: 16, pp. 5245-5254 (1996).
Sciannamea, et al., "Fast controlled radical polymerization of styrene mediated by oligomeric nitroxides formed in situ", Macromolecular Rapid Communications vol. 28, Issue: 2, pp. 147-151 (2007).
Zarycz, et al., "Joint Theoretical Experimental Investigation of the Electron Spin Resonance Spectra of Nitroxyl Radicals: Application to Intermediates in Situ Nitroxide Mediated Polymerization (in Situ NMP) of Vinyl Monomers", J. Physical Chemistry B (2008), 112(34), pp. 10432-10442.

* cited by examiner

*Primary Examiner* — Alexandre F Ferre
(74) *Attorney, Agent, or Firm* — Kenneth Crimaldi

(57) ABSTRACT

Provided is a method of forming a polymer, comprising (a) providing a reaction mixture comprising (i) one or more vinyl monomers, (ii) one or more pH-sensitive inhibition systems, (iii) one or more initiators, and (iv) water; (b) establishing conditions in said reaction mixture such that a free radical polymerization of said vinyl monomer occurs at a location, and (c) after steps (a) and (b) and prior to completion of said free radical polymerization, changing the pH of said reaction mixture to increase the rate of generation of said free radical polymerization at the location of said free radical polymerization.

3 Claims, No Drawings

POLYMER WITH RELEASABLE GAS

Free radical polymerization processes that are conducted in aqueous media are often conducted in the presence of one or more of various additives in addition to initiator and monomer. For example, sometimes an inhibitor is present, for example to prevent certain undesirable polymerization reactions in favor of the desired polymerization reaction(s). For example, when suspension polymerization is desired, an inhibitor may be present in order to inhibit the process of emulsion polymerization. One commonly used inhibitor is a dichromate salt. Dichromate salts are undesirable because of the toxicity of various chromium compounds. For another example, an acid having first pKa of 8 to 12 is sometimes used, for example to buffer the aqueous medium at a pH of 8 to 12. One commonly used organic acid having first pKa of 8 to 12 is boric acid. Boric acid is undesirable because of the toxicity of various boron compounds. For a third example, gelatin is sometimes used, for example as a dispersion stabilizer. Gelatin is sometimes undesirable because it is derived from animals, and sometimes it is desired to avoid the use of animal products. Attempts to conduct free radical polymerization in aqueous media without one or more of these additives have led to one or more difficulties. For example, some of such attempts have led to polymerization processes that failed to run to completion or that took an undesirably long time to run to completion.

U.S. Pat. No. 6,737,488 describes a process for the production of polymers that entails (i) reacting a polymerizable vinyl monomer with nitrogen monoxide and at least one initiator to prepare a free-radical intermediate product, and (ii) polymerizing the intermediate product optionally together with one or more additional monomers and/or with a free-radical initiator.

It is desired to provide a polymerization process that is capable of operating properly without some or all of the undesirable additives described above. Also desired is a polymerization process that has one or both of the following characteristics: the polymerization process runs to completion in a desirably short time, and the polymerization process yields polymer that is capable of being converted to ion exchange resin of acceptable quality.

The following is a statement of the invention.

A first aspect of the present invention is a method of forming a polymer, comprising
  (a) providing a reaction mixture comprising
    (i) one or more vinyl monomers
    (ii) one or more pH-sensitive inhibition systems
    (iii) one or more initiators
    (iv) water
  (b) establishing conditions in said reaction mixture such that a free radical polymerization of said vinyl monomer occurs at a location, and
  (c) after steps (a) and (b) and prior to completion of said free radical polymerization, changing the pH of said reaction mixture to increase the rate of generation of said free radical polymerization at the location of said free radical polymerization.

A second aspect of the present invention is a method of forming a polymer, comprising
  (a) providing a reaction mixture comprising
    (i) one or more vinyl monomers, located at a monomer location,
    (ii) one or more pH-sensitive inhibition systems
    (iii) one or more initiators
    (iv) water wherein the amount of any buffer in said reaction mixture is 0 to 0.1% by weight based on the weight of said reaction mixture,
wherein said reaction mixture has pH value at which said pH-sensitive inhibition system is in low-generation-rate mode;
  (b) after step (a), establishing conditions in said reaction mixture such that a free radical polymerization of said vinyl monomer occurs.

A third aspect of the present invention is a polymeric composition comprising a polymeric composition comprising polymeric particles and releasable nitrogen monoxide, wherein said polymeric particles have volume-average particle size of 0.05 mm to 1.5 mm.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer.

Vinyl monomers have the structure

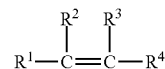

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

Styrenic monomers are vinyl monomers in which each of $R^1$, $R^2$, and $R^3$ is hydrogen and —$R^4$ has the structure

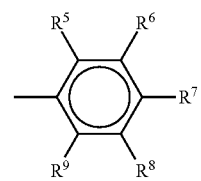

where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

Acrylic monomers are vinyl monomers in which each of $R^1$ and $R^2$ is hydrogen; $R^3$ is either hydrogen or methyl; and —$R^4$ has one of the following structures:

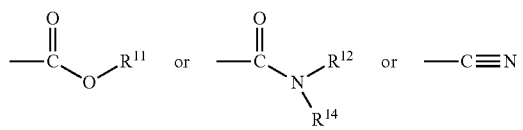

where each of $R^{11}$, $R^{12}$, and $R^{14}$ is, independently, hydrogen, a $C_1$ to $C_{14}$ alkyl group, or a substituted $C_1$ to $C_{14}$ alkyl group.

A reaction among monomers to form one or more polymers is referred to herein as a polymerization process. A polymerization process is said herein to have run to completion when the amount of unreacted monomer in the vessel in which the polymerization process is taking place is 5 mass % or less, based on the sum of the mass of unreacted monomer and the mass of polymer made in the polymerization process.

Polymerization is said herein to take place in a "location." The location of the polymerization depends on the type of polymerization. The location refers to the specific region at which the monomers are reacting to form polymer. For example, in bulk polymerization, the location of polymerization is throughout the monomer. In suspension polymerization, the location of polymerization is in or on the surface of monomer-containing droplets suspended in a liquid medium. In emulsion polymerization, the location of polymerization is in or on surfactant micelles or is in or on growing polymer particles. In solution polymerization, the location of polymerization is throughout the solution.

As used herein, an inhibitor is a molecule that interacts with a free radical to create a moiety (herein the "dead-end" moiety) that is not susceptible to free radical polymerization. The inhibitor may interact with a free radical to form the dead-end moiety directly, or the inhibitor may first form one or more intermediates, and the intermediate may interact with a radical to form a dead-end moiety. In cases where the inhibitor first forms an intermediate, the formation of the intermediate may occur through a reaction between the inhibitor and a free radical.

A pH-sensitive inhibition system is a composition that exhibits a change in its tendency to generate inhibitor at the location of polymerization due to a change in pH.

There are several types of pH-sensitive inhibition systems. For example, in one type of pH-sensitive inhibition system (herein "type I"), the inhibitor is formed by a chemical reaction of a non-inhibitor species (herein called "inhibitor precursor"). The inhibitor is in chemical equilibrium with the inhibitor precursor; and the tendency of the equilibrium to shift toward higher or lower concentration of inhibitor depends on the pH. For Example, when a type I inhibition system is used, the inhibitor precursor and the inhibitor could both be in the same location as the polymerization; then, if the pH were changed, as the equilibrium between the inhibitor precursor and the inhibitor shifted, the tendency of the pH-sensitive inhibition system to generate inhibitor at the location of polymerization would also shift.

When a type I pH-sensitive inhibition system is used, the "amount" of the inhibition system is taken herein to be the amount of inhibitor precursor that would be present if the chemical equilibrium between the inhibitor precursor and the inhibitor were driven completely to the inhibitor precursor. This method of characterizing the amount of inhibition system is especially convenient in embodiments in which inhibitor precursor and not inhibitor is added directly to the reaction mixture, and then the only inhibitor present in the reaction mixture is the inhibitor that is produced by the chemical reaction of the inhibitor precursor.

Another type of pH-sensitive inhibition system (herein "type II") is important when it is present in a heterogeneous mixture in which domains of a first composition are dispersed in a continuous medium of a second composition, and when the location of polymerization is in one of the two compositions more than in the other. The type II inhibition system could contain, for a example, an inhibitor that is chosen so that the relative concentration of the inhibitor in the first composition versus the second composition is determined by the pH. For example, if the location of polymerization were in the first composition, then as the pH were shifted, the equilibrium would also shift, thus generating inhibitor at a different rate in the first composition.

When a type II pH-sensitive inhibition system is used, the "amount" of the inhibition system is taken herein to be the amount of inhibitor.

A pH-sensitive inhibition system could possibly be both type I and type II. For example, in a heterogeneous mixture, an inhibitor precursor could be present that was capable of reacting to form an inhibitor; and equilibrium could be established between the inhibitor precursor and the inhibitor that was altered by changes in pH; and the inhibitor, once formed, could partition between the different compositions in the heterogeneous mixture in proportions that were dependent on pH. When a pH-sensitive inhibition system is both type I and type II, the "amount" of the pH sensitive inhibition system is characterized in the same way as a type I pH sensitive inhibition system.

For any pH-sensitive inhibition system, it is possible to find a pH value at which the inhibition system has a relatively strong tendency to quickly produce inhibitor at the location of polymerization, and that pH value is labeled herein as PHFAST. The pH value PHFAST, depending on the pH-sensitive inhibition system, may be a relatively high pH value or a relatively low pH value. Similarly, it is possible to find a pH value at which the inhibition system has a relatively weak tendency to quickly produce inhibitor at the location of polymerization, and that pH value is labeled herein as PHSLOW. In some pH-sensitive inhibition systems, PHSLOW will be a lower pH value than PHFAST. In other pH-sensitive inhibition systems, PHSLOW will be a higher pH value than PHFAST. In all cases, the difference between PHSLOW and PHFAST is 1 pH unit or more.

The reaction mixture is said to be in low-generation-rate mode when the pH of the reaction mixture has value pHX that is chosen so that PHSLOW is in between PHX and PHFAST. When a pH-sensitive inhibition system is used in which PHSLOW<PHFAST, the reaction mixture is in low-generation-rate mode when

PHX<PHSLOW<PHFAST

Alternatively, when a pH-sensitive inhibition system is used in which PHFAST<PHSLOW, the reaction mixture is in low-generation-rate mode when

PHFAST<PHSLOW<PHX.

When the reaction mixture is in low-generation-rate mode, the tendency of the pH-sensitive inhibition system to produce inhibitor at the location of polymerization is equal to or lower than that tendency when the pH value is PHSLOW.

Similarly, the reaction mixture is said to be in high-generation-rate mode when the pH of the reaction mixture has value PHY that is chosen so that PHFAST is in between PHY and PHSLOW. When a pH-sensitive inhibition system is used in which PHSLOW<PHFAST, the reaction mixture is in high-generation-rate mode when

PHSLOW<PHFAST<PHY

Alternatively, when a pH-sensitive inhibition system is used in which PHFAST<PHSLOW, the reaction mixture is in high-generation-rate mode when

PHY<PHFAST<PHSLOW

When the reaction mixture is in high-generation-rate mode, the tendency of the pH-sensitive inhibition system to produce inhibitor at the location of polymerization is equal to or higher than that tendency when the pH value is PHFAST.

As used herein, an initiator is a molecule that is stable at ambient conditions but that is capable under certain conditions of producing one or more fragments that bears a free radical, and that fragment is capable of interacting with a monomer to start a free radical polymerization process. The conditions that cause production of a fragment bearing a free radical include, for example, elevated temperature, participation in an oxidation-reduction reaction, exposure to ultraviolet and/or ionizing radiation, or a combination thereof.

As used herein, ion exchange is a process in which ions in solution become attached to a solid resin (an ion exchange resin), and those ions are exchanged for ions of the same type of charge that are released by the ion exchange resin. Functional groups located on the resin have opposite charge to the ions being exchanged, and those functional groups are known herein as ion exchange groups.

A compound is said herein to be water-soluble if 5 grams or more of the compound forms a stable solution in 100 ml of water at 25° C. In the case of some water-soluble polymers, the water may need to be heated above 25° C. in order to make the polymer dissolve, but after cooling to 25° C., the solution is stable when held at 25° C.

As used herein, a base compound is a compound that has the ability to accept a proton to form the conjugate acid of that compound, and the conjugate acid of that compound has pKa of 9 or greater. As used herein, an acid compound is a compound that has the ability to release a proton, and the compound has pKa of 5 or less. A buffer is either (i) a compound that has the ability to accept a proton to form the conjugate acid of that compound, and the conjugate acid of that compound has pKa of less than 9, or (ii) a compound that has the ability to release a proton, and the compound has pKa of greater than 5.

As used herein, "ambient conditions" means temperature of 25° C. and pressure of 1 atmosphere.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The method of the present invention involves a reaction mixture that contains one or more vinyl monomers, one or more inhibitors, one or more initiators, and water.

Preferably, at every time from the formation of the reaction mixture until the completion of the polymerization reaction, the reaction mixture has pH between 2.0 and 12.0.

Preferably, the amount of water is, by weight based on the total weight of the composition, 25% or more; more preferably 50% or more; more preferably 55% or more.

Preferred vinyl monomers are styrenic monomers, acrylic monomers, and mixtures thereof. Preferably, all the monomers used are selected from styrenic monomers, acrylic monomers, and mixtures thereof. More preferably, all the monomers used are selected from styrenic monomers. Preferably, the vinyl monomer includes one or more monofunctional vinyl monomer. Preferred monofunctional vinyl monomers are acrylic and styrenic monofunctional monomers; more preferred are monofunctional styrenic monomers; more preferred is styrene. Preferably, the vinyl monomer includes one or more multifunctional vinyl monomer. Preferred multifunctional vinyl monomers are multifunctional styrenic monomers; more preferred is divinyl benzene. Preferably, the amount of vinyl chloride is, by weight based on the total weight of all monomers, 0 to 0.1%, more preferably 0 to 0.01%; more preferably 0%.

Preferably, the amount of monofunctional vinyl monomer is, by weight based on the weight of all monomers, 50% or more: more preferably 60% or more; more preferably 70% or more; more preferably 80% or more. Preferably, the amount of monofunctional vinyl monomer is, by weight based on the weight of all monomers, 100% or less; more preferably 98% or less; more preferably 96% or less.

Preferably, the amount of multifunctional vinyl monomer is, by weight based on the weight of all monomers, 1% or more: more preferably 2% or more; more preferably 3% or more; more preferably 4% or more. Preferably, the amount of multifunctional vinyl monomer is, by weight based on the weight of all monomers, 55% or less; more preferably 40% or less; more preferably 30% or less; more preferably 20% or less.

Preferably, the total amount of monomer, by weight based on the total weight of the reaction mixture, is 5% or more; more preferably 10% or more; more preferably 15% or more. Preferably, the total amount of monomer, by weight based on the total weight of the reaction mixture, is 55% or less; more preferably 35% or less; more preferably 30% or less.

The reaction mixture contains one or more pH-sensitive inhibition system. When an inhibitor system herein is said to "involve" a compound, that compound may be an inhibitor precursor or an inhibitor or an intermediate that participates in the transformation of inhibitor precursor into inhibitor. Preferred inhibition systems involve one or more of phenol, derivatives of phenol, oxygen releasers, metal-containing compounds, nitrite salts, and derivatives of nitrite salts. Preferred are nitrite salts and derivatives of nitrite salts. Among derivatives of phenol, preferred are catechol, resorcinol, hydroquinone, and phloroglucinol. Among oxygen releasers, preferred are percarbonates, perborates, and peroxides. Among metal-containing compounds, preferred are pH-sensitive complexes of transition metals. Among nitrite salts, preferred are water-soluble nitrite salts; more preferred are alkali metal nitrite salts; more preferred is sodium nitrite. Among derivatives of nitrite salts, preferred are derivatives of water-soluble nitrite salts; more preferred are derivatives of alkali metal nitrite salts; more preferred are derivatives of sodium nitrite.

Preferably the amount of pH-sensitive inhibition system is, by weight based on the weight of water, 0.002% or greater; more preferably 0.005% or greater. Preferably the amount of pH-sensitive inhibition system is, by weight based on the weight of water, 1% or less; more preferably 0.5% or less; more preferably 0.2% or less.

The reaction mixture contains one or more initiator. Preferred initiators have solubility in 100 mL of water at 25° C. of 1 gram or less; more preferably 0.5 gram or less; more preferably 0.2 gram or less; more preferably 0.1 gram or less. Preferred are peroxide and hydroperoxide initiators; more preferred are peroxide initiators; more preferred are benzoyl peroxide and derivatives thereof; more preferred is benzoyl peroxide. Preferably, the weight ratio of initiator to total monomer is 0.001:1 or higher; more preferably 0.002:1 or higher. Preferably, the weight ratio of initiator to total monomer is 0.02:1 or lower; more preferably 0.01:1 or lower; more preferably 0.007:1 or lower.

The reaction mixture preferably contains one or more water-soluble polymer. Preferred water-soluble polymers are water-soluble polyvinyl alcohol polymers, water-soluble derivatives of cellulose, and mixtures thereof. Among water-soluble derivatives of cellulose, preferred are carboxymethyl methylcelluloses. Among polyvinyl alcohol polymers, preferred are those with degree of hydrolysis of 80% to 90%. Preferably the reaction mixture contains one or more water-soluble polyvinyl alcohol polymers and one or more water-soluble derivatives of cellulose.

When one or more water-soluble polymers are used, preferably the total amount of water-soluble polymers is, by weight based on the weight of the water, 0.02% or higher; more preferably 0.05% or higher; more preferably 0.1% or higher. When one or more water-soluble polymers are used, preferably the total amount of water-soluble polymers is, by weight based on the weight of the water, 1% or less; more preferably 0.5% or less.

Gelatin may or may not be present in the reaction mixture. When gelatin is present, the amount is, by weight based on the weight of the water, 2% or less; or 1% or less; or 0.5% or less. Preferred embodiments have little or no gelatin. Preferably the amount of gelatin is sufficiently low that the amount of gelatin is, by weight based on the weight of water, 0 to 0.01%; more preferably 0 to 0.001%. More preferably the amount of gelatin is zero.

In the practice of the present invention, in preferred embodiments (herein called "nitrite" embodiments), the pH-sensitive inhibition system is introduced to the reaction mixture by introducing one or more water-soluble nitrite salts.

In nitrite embodiments, the pH of the reaction mixture prior to the beginning of free radical polymerization is 11 or lower; more preferably 10 or lower; more preferably 9 or lower; more preferably 8 or lower; more preferably 7.5 or lower, more preferably 7.0 or lower. In nitrite embodiments, prior to the beginning of the free radical polymerization the pH of the reaction mixture is preferably 3 or higher; more preferably 4 or higher; more preferably 5 or higher; more preferably 5.5 or higher.

It is considered that, when water-soluble nitrite salt is added to the reaction mixture, some or all of the water-soluble nitrite salt dissolves in the water in the reaction mixture, and that, at pH of 8 or below, some or all of the dissolved nitrite anion is converted to one or more of nitrogen monoxide or other compound of formula NxOy, where x is 1 or 2, y is 1 to 5, and when x is 2, y is 1, 3, 4, or 5. It is considered that the most likely NxOy compound to be produced is nitrogen monoxide, possibly in combination with one or more other NxOy compound. A compound of formula NxOy that is formed when a water soluble nitrite salt is added to the reaction mixture is considered herein to be a derivative of the water soluble nitrite salt.

Two preferred embodiments are contemplated, herein called "pH change" embodiments and "initial PHSLOW" embodiments.

In pH change embodiments, the reaction mixture is formed with a pH that puts the reaction mixture in high-generation-rate mode. If necessary, an acid, base, or buffer may optionally be added to the reaction mixture to establish the desired pH value. The free radical polymerization is begun while the reaction mixture is in high-generation-rate mode. Then, after the polymerization has begun but before the polymerization reaches completion, the pH is adjusted to put the reaction mixture into low-generation-rate mode. It is contemplated that this change in pH will lower the effectiveness of the inhibitor and thus increase the rate of the polymerization. In some pH change embodiments, after the pH adjustment has been completed, as the polymerization continues, the pH may change in the reaction mixture, moving back in the direction of high-generation-rate mode. In some pH change embodiments, more than one pH adjustment may be performed. The pH adjustment may be accomplished by addition of an acid, a base, or a buffer.

In initial PHSLOW embodiments, the reaction mixture is formed with a pH that puts the reaction mixture in low-generation-rate mode. If necessary, an acid or base may optionally be added to the reaction mixture to establish the desired pH value. The free radical polymerization is begun while the reaction mixture is in low-generation-rate mode. During the course of the polymerization the pH may or may not be adjusted. In some initial PHSLOW embodiments, as the polymerization continues, the pH may change in the reaction mixture, moving in the direction of high-generation-rate mode. In initial PHSLOW embodiments, the reaction mixture does not contain buffer.

More preferred are pH change embodiments.

In nitrite embodiments, the pH of the reaction mixture prior to the beginning of polymerization may optionally be established by addition of one or more acid to the reaction mixture. When an acid is added, preferred acids have first pKa of 3 or higher; more preferably 4 or higher. When an acid is used, any type of acid may be used; preferred are organic acids. Preferably, no acid is added to the reaction mixture; that is, it is preferred that the ingredients listed above establish a pH in the reaction mixture that is 7.5 or lower without the addition of acid. Preferably, no buffer is present in the reaction mixture.

In all embodiments, the present invention involves establishing conditions (herein "polymerization conditions") in the reaction mixture such that free radical polymerization of the vinyl monomer occurs. Preferably, polymerization conditions are established after the reaction mixture is formed. Alternatively, polymerization conditions may be established when the reaction mixture is partially formed, or may be established so that polymerization begins when initiator and monomer first encounter each other.

The nature of the polymerization conditions depends in part on the nature of the initiator that is used. Polymerization conditions involve conditions in which the initiator forms sufficient free radicals to initiate the polymerization process. For example, when a thermal initiator is used, polymerization conditions involve establishing a temperature above 25° C. that is high enough for a significant fraction of the initiator molecules to decompose to form free radicals. For another example, if a photoinitiator is used, polymerization conditions involve exposing the initiator to radiation of sufficiently low wavelength and of sufficiently high intensity for a significant fraction of the initiator molecules to decompose to form free radicals. For another example, when the initiator is a redox initiator, polymerization conditions involve the presence of sufficiently high concentration of both the oxidant and the reductant such that a significant number of free radicals are produced. Preferably, a thermal initiator is used. Preferably, polymerization conditions involve temperature of 65° C. or higher; more preferably 75° C. or higher.

At any moment, the extent of the free radical polymerization in the vessel that contains the reaction mixture may be characterized as follows.

$$\text{Extent}=100*PM/TM$$

where PM is the mass of polymer formed by the free radical polymerization process, and TM is the total mass of monomer that has been added to the vessel.

In pH change embodiments, the method of the present invention involves changing the pH of the reaction mixture after free radical polymerization has begun to take place in the reaction mixture but before the completion of the free radical polymerization. Free radical polymerization is considered complete when the extent of the polymerization reaction is 95% or more.

In pH change embodiments, between the time that free radical polymerization begins and the time of changing the pH for the first time after the beginning of free radical polymerization, it is preferred that the pH remain in a in high-generation-rate mode.

In nitrite embodiments, between the time that free radical polymerization begins and the time of changing the pH for the first time after the beginning of free radical polymerization, it is preferred that the pH remain below 7.5; more preferably below 7. In nitrite embodiments, between the time that free radical polymerization begins and the time of adding a base compound, it is preferred that the pH remain above 3; more preferably above 5.

Preferably, when the pH is changed, the change is performed by adding a base compound or an acid compound or a buffer. Base compound or acid compound or buffer may be added in any manner. For example, base compound or acid compound or buffer may be added gradually, may be added in one single sudden operation ("shot"), may be added in plural shots, or any combination thereof. Preferred is plural shots. Preferably, the number of shots is 2 or more. Preferably, the number of shots is 8 or fewer; more preferably 5 or fewer.

In any one shot, the addition of base compound or acid compound or buffer is preferably completed quickly enough so that the extent of reaction increases over the duration of the shot by 5 percentage points or less; more preferably 2 percentage points or less; more preferably 1 percentage point or less.

Preferably, when plural shots are used, the first shot contains, by weight based on the total weight of base compound or acid compound or buffer added during polymerization, 5% or more of the base compound or acid compound or buffer; more preferably 10% or more. Preferably, when plural shots are used, the first shot contains, by weight based on the total weight of base compound or acid compound or buffer added during polymerization, 60% or less of the base compound or acid compound or buffer; more preferably 40% or less.

Preferably, when one or more shots are used, the pH of the reaction mixture immediately after the shot is different from the pH of the reaction mixture immediately before the shot by 2 or more pH units; more preferably 3 or more pH units; more preferably 4 or more pH units; more preferably 5 or more pH units.

Preferably, the total amount of base compound or acid compound or buffer added during polymerization is, by weight based on the weight of the water, 25 ppm (parts per million) or more; more preferably 50 ppm or more; more preferably 100 ppm or more; more preferably 150 ppm or more. Preferably, the total amount of base compound or acid compound or buffer added during polymerization is, by weight based on the weight of the water, 1,000 ppm or less; more preferably 600 ppm or less; more preferably 300 ppm or less.

In pH change embodiments, changing the pH may be performed at any time after the beginning of free radical polymerization and before completion of free radical polymerization. Preferably, changing the pH is begun when the extent of the polymerization reaction is 20% or more; more preferably 35% or more. Preferably, changing the pH is begun when the extent of the polymerization reaction is 90% or less.

In nitrite embodiments, it is preferred that changing the pH is done by raising the pH by adding one or more base compound.

Among base compounds, preferred are organic base compounds and inorganic base compounds. More preferred are inorganic base compounds; more preferred are alkali hydroxides and ammonium hydroxide; more preferred are alkali hydroxides. Preferably, when base compound is added to the reaction mixture, the addition is performed by first forming an aqueous solution of a base compound and then adding that solution to the reaction mixture. Preferred aqueous solutions have concentration of base compound, by weight based on the weight of the solution, of 1% or more; more preferably 2% or more; more preferably 5% or more. Preferred aqueous solutions have concentration of base compound, by weight based on the weight of the solution, of 50% or less; more preferably 25% or less; more preferably 15% or less; more preferably 10% or less.

The reaction mixture may or may not contain boric acid. When boric acid is present, the amount may be, by weight based on the weight of water, 2% or less, or 1% or less, or 0.5% or less. Preferably, the reaction mixture contains little or no boric acid. Preferably, the amount of boric acid in the reaction mixture is 0 to 0.01% by weight, based on the weight of water; more preferably 0%.

Preferably, prior to the beginning of the polymerization process, droplets form in the reaction mixture, and the droplets contain vinyl monomer and initiator. Preferably the droplets are distributed throughout a continuous liquid medium, and preferably the composition of the continuous liquid medium contains water in the amount, by weight based on the weight of the continuous liquid medium, of 45% or more. Compounds dissolved in the water are considered to be part of the continuous liquid medium. Preferably, the volume average particle size of the droplets is 50 μm to 1,500 μm. Preferably, prior to the beginning of free radical polymerization, amount of monomer that is located within droplets, by weight based on the total weight of monomer, is 75% or more; more preferably 85% or more; more preferably 90% or more; more preferably 95% or more; more preferably 99% or more. Preferably, prior to the beginning of free radical polymerization, amount of initiator that is located within droplets, by weight based on the total weight of initiator, is 75% or more; more preferably 85% or more; more preferably 90% or more; more preferably 95% or more; more preferably 99% or more. Preferably, vinyl polymerization takes place inside the droplets. Preferably the vinyl polymerization process is a suspension polymerization process.

The following illustrative example may be useful in understanding the present invention. It is useful to describe a comparative polymerization process (herein "P1"). Process P1 is an aqueous suspension free radical polymerization process conducted at pH around 10, and the pH is maintained during the polymerization process by the presence of boric acid. In process P1, sodium nitrite is added; it is contemplated that nitrogen monoxide and/or other NxOy compounds are produced from the sodium nitrite and act to inhibit the process of emulsion polymerization. It is contemplated that some portion of the nitrogen monoxide and/or other NxOy compounds could also partition into the organic phase and inhibit polymerization with the developing beads as well. During the process of making the present invention, an altered process (herein "P2") was performed by removing the boric acid from process P1. It was observed that P2 operates at pH around 6. Process P2 starts by polymerizing at a normal rate but then slows down and takes an undesirably long time to run to completion. During the process of making the present invention it was discovered that addition of a base compound during the polymerization process resulted in an increase in the rate of the polymerization reaction, and the process ran to completion in less time. That is, the addition of a base compound to process P2 allowed the creation of a process that was free of boric acid and that could run to completion in a reasonably short time. The addition of the base compound in process P2 resulted in a sudden increase in the polymerization rate that is not observed in process P1.

Another example of the same principle does not require the addition of a base compound during the polymerization, rather a different starting pH and pH profile through the polymerization. For this type of system, consider two different versions according to the P2 process—(1) starting pH of around 7, decreasing to around 5 by the end of the polymerization and (2) starting pH around 11 (adding base compound at extent=0%), pH decreasing to around 5 by the end of the polymerization. For (1), 22 hours was required for conversion to polymer in the organic phase to exceed 70%; for (2), only 13 hours was required for extent of polymerization to exceed 80%.

While the invention is not limited by any theory, the following comments regarding a proposed mechanism may aid in conveying an understanding of the invention. It is contemplated that some inhibitors are capable of forming radical moieties that are capable of combining with the radical on a growing polymer chain to form an inert species, thus stopping the polymerization process. The chemical reaction that forms that inert species, though, is sometimes reversible. Such mechanisms have been proposed, for example, by C. Detrembleur et al., in "Sodium nitrite and ascorbic acid: a metal-free combination that controls the free-radical polymerization of tert-butyl methacrylate in water," e-Polymers, volume 2002, number 004, http://www.e-polymers.org. It is contemplated that base compound promotes a reversal of the formation of the inert species, thus releasing the growing polymer chain for further growth. This theory is consistent with certain known features of nitrite salts and related compounds. For example, nitrous acid ($HNO_2$) has pKa of approximately 3.4. Also, nitrous acid is a precursor for some NxOy compounds, and some or all of the NxOy compounds (for example, nitrogen monoxide) are capable of acting as inhibitors. In the making of the present invention, it was contemplated that, when sodium nitrite was present in a reaction mixture having pH below 7, a significant amount of the nitrite ion would be present in the form of non-dissociated nitrous acid, some of which would form one or more NxOy compounds and set up an equilibrium between nitrous acid and NxOy. Then, if the pH were raised far above 7, the nitrous acid would dissociate to form nitrite ion that was solvated in water and that would not have as great a tendency to form NxOy compounds. Also, as nitrous acid was converted to nitrite ion, it is contemplated that the depletion of nitrous acid would cause the equilibrium between nitrous acid and NxOy to shift toward the nitrous acid, thus depleting the amount of NxOy. Thus it is contemplated that raising the pH could decrease the amount of inhibitors.

The present invention also involves a polymeric composition. The polymeric composition is preferably made by the method of the present invention. Preferably, the polymeric composition contains polymeric particles. Polymeric particles are particles that are solid at 25° C. and that contain polymer in the amount, by weight based on the weight of the polymeric particles, of 80% or more; preferably 90% or more; more preferably 95% or more.

Preferably the polymeric particles have volume average particle size of 50 µm to 1,500 µm.

Preferred polymers in the polymeric particles are the polymers formed by free radical polymerization of the preferred vinyl monomers described above. Preferably the polymer contains polymerized units of styrenic monomer in the amount, by weight based on the weight of the polymer, of 5% or more; more preferably 25% or more; more preferably 50% or more; more preferably 75% or more.

The polymeric composition also contains releasable nitrogen monoxide. Releasable nitrogen monoxide is nitrogen monoxide that is released by the polymer at some temperature between 150° C. and 300° C. under pressure of less than 0.1 atmosphere. Releasable nitrogen monoxide may be in the form of nitrogen monoxide molecules that are intimately mixed with the polymer but not covalently bound to the polymer. Alternatively, releasable nitrogen monoxide may be in the form of a functional group that contains both nitrogen and oxygen atoms that is covalently bound to the polymer at 25° C. but that releases nitrogen monoxide to the atmosphere when heated to some temperature between 150° C. and 300° C. under atmospheric pressure of 0.1 atmosphere or less. Alternatively, whether covalently bound or not, nitrogen-containing molecule or functional group may be present in the polymer and then, when the polymer is heated, the nitrogen-containing molecule or functional group may be released and may react to become nitrogen monoxide during the release process. A polymeric composition is also considered herein to contain releasable nitrogen monoxide if that polymeric composition contains one or more moieties, either covalently bound to the polymer or intimately mixed with the polymer, that are released to the atmosphere when heated to some temperature between 150° C. and 300° C. under atmospheric pressure of 0.1 atmosphere or less and that, when subjected to procedures for gas chromatography and mass spectrometry, produce nitrogen monoxide. For example, a single moiety that contains atoms of nitrogen and oxygen may be released, and that moiety may decompose to form nitrogen monoxide. For another example, two or more moieties may be released that interact with each other to produce nitrogen monoxide.

A preferred use of the polymer produced in the free radical polymerization of the present invention is to be used in a conversion process to produce an ion exchange resin. That is, the polymer is subjected to one or more chemical reactions, each involving one or more reagents in addition to the polymer, to covalently attach one or more ion exchange groups to the polymer. Preferred ion exchange groups are sulfonic groups, carboxyl groups, tertiary amine groups, and quaternary amine groups. More preferred are sulfonic groups and carboxyl groups; more preferred are sulfonic groups.

The following are examples of the present invention.

The following materials were used:
DI water=deionized water
CMMC=carboxymethyl methylcellulose
PVOH=SelVol™ 523 polyvinylalcohol, from Sekisui Specialty Chemicals
DVB=divinyl benzene (purity 63% by weight)
BPO=benzoyl peroxide (purity 75% by weight)
Styrene (purity >99%)
NaOH: NaOH was added in the form of a solution of concentration 5% to 25% by weight.

Method of Evolved Gas Analysis on Dried Resin

Polymeric particles were dried and then heated under vacuum from 100° C. to 250° C. at 50° C. per minute, with a 10 minute hold at 250° C. Evolved gases were cryo-trapped together at −190° C. The evolved gases were then analyzed by gas chromatography, with specific fractions analyzed by mass spectrometry. In order to calibrate the gas chromatograph, a sample of polyvinyl pyrrolidone (PVP) was tested. PVP is known to release nitrogen monoxide gas. The gases released by PVP and cryo-trapped, when analyzed by gas chromatography, showed a peak at retention time of 103 seconds. The material having retention time of 103 seconds from the PVP sample was analyzed by mass spectrometry and was determined to be nitrogen monoxide by matching the mass spectrometry results to those for nitrogen monoxide published by the United States National Institute for Standards and Technology.

Preparation of Reaction Mixture

A suspension of droplets suspended in an aqueous medium was made using the jetting procedure described in U.S. Pat. No. 4,444,960 and U.S. Pat. No. 4,623,706. Droplets contained Styrene, DVB, and BPO. The aqueous medium contained DI water, CMMC, PVOH, and sodium nitrite. The ingredients intended for the composition of the droplets were as follows:

| Droplet ingredients: | |
|---|---|
| Ingredient | amount[1] |
| Styrene | balance[2] |
| DVB | 5.2% |
| BPO | 0.5% |

Note
[1]% by weight based on the total weight of droplet ingredients.
Note
[2]to make up 100% by weight The ingredients intended for the aqueous liquid medium were as follows:

| Aqueous-Phase Ingredients | |
|---|---|
| ingredient | amount[3] |
| DI water | 100% |
| CMMC | 0.23% |
| PVOH | 0.06% |
| NaNO$_2$ | 0.1% |

Note
[3]% by weight based on the total weight of aqueous phase ingredients

During the preparation of the reaction mixture, some individual ingredients or partial mixtures were, if necessary, temporarily heated to achieve good mixing, but the reaction mixture was provided at approximately 25° C.

The weight ratio of droplet ingredients to aqueous phase ingredients was 0.3:1.

EXAMPLE 1: NaOH ADDITION AT EXTENT OF REACTION OF 53%

Preparation of Example 1

Aqueous suspension polymerization was conducted on the reaction mixture as follows. The reaction mixture was heated to 80° C., and the extent of reaction was monitored. At certain points, a portion of a solution of NaOH was added to the reaction mixture. The amount of NaOH added is characterized by the ppm by weight of NaOH based on the weight of water. The preparation proceeded as follows

| Extent | Event |
|---|---|
| 53% | Add 210 ppm NaOH |
| 88% | add 100 ppm NaOH, and increase temperature to 92° C. |

At the start of the polymerization, pH was 6.5. At completion of the polymerization, pH was 10.8. The product was polymeric beads of harmonic mean size of 210 μm.

The results for Example 1 were as follows:

| extent (%) | rate (%/hr) | extent (%) | rate (%/hr) | extent (%) | rate (%/hr) |
|---|---|---|---|---|---|
| 2 | 14 | 41 | 29 | 73 | 46 |
| 7 | 13 | 53 | note[4] | 80 | 38 |
| 12 | 17 | 55 | 31 | 85 | 35 |
| 20 | 22 | 60 | 51 | 88 | note[4] |
| 26 | 23 | 64 | 51 | 90 | 32 |
| 34 | 27 | 68 | 51 | | | note
[4]addition of NaOH solution

All measurements taken after extent of 90% showed rate of 20%/hr or lower. Prior to NaOH addition at extent of 53%, the rate was leveling off at ~30%/hr; following NaOH addition, the rate quickly increased to 51%/hr and stayed above 30%/hr until extent of 90%. This demonstrates that addition of NaOH accelerated the rate, which would not have occurred without NaOH addition COMPARATIVE EXAMPLE CA: NO NaOH ADDITION AT EXTENT OF 53%

Comparative Example CA used the same materials and methods as Example 1, except that no addition of NaOH was made at extent of 53%. The results through extent of 75% are shown:

COMPARATIVE EXAMPLE CA

| extent (%) | rate (%/hr) | extent (%) | rate (%/hr) | extent (%) | rate (%/hr) |
|---|---|---|---|---|---|
| 2 | 15 | 25 | 22 | 56 | 28 |
| 4 | 16 | 30 | 25 | 60 | 27 |
| 6 | 13 | 40 | 27 | 62 | 26 |
| 8 | 11 | 50 | 28 | 65 | 25 |
| 12 | 17 | 52 | 28 | 72 | 19 |
| 18 | 19 | 54 | 28 | 75 | 17 |

The results of rate vs. extent for Comparative Example CA are very similar to those of Example 1, up to the extent of 53%. After extent of 53%, the rate of Comparative Example CA gradually declined. This further demonstrates that the increase in rate of Example 1 after extent of 53% was caused by the addition of NaOH to Example 1 at 53%.

EXAMPLE 2: NaOH ADDITION AT EXTENT OF 32.5% TO 51%, WITH pH MEASUREMENTS

Three further polymerizations (Examples 2-1, 2-2, and 2-3) were conducted using the same materials and methods as in Example 1. In Example 2, the extent at which NaOH was added varied, and the overall batch size in Example 2 was smaller than in Example 1. In Example 2, the pH was measured immediately after addition of NaOH. The results were as follows:

EXAMPLE 2

|  | 2-1 | 2-2 | 2-3 |
| --- | --- | --- | --- |
| initial pH | 6.4 | 6.5 | 6.5 |
| Extent at first NaOH addition | 42% | 51% | 32.5% |
| ppm of first NaOH addition | 210 | 210 | 210 |
| pH immediately after first NaOH addition | 11.26 | 11.27 | 11.58 |
| Extent at second NaOH additon | 87.5% | 86.0% | 87.5% |
| pH immediately before second NaOH addition | 7.31 | 7.75 | 7.24 |
| ppm of second NaOH addition | 100 | 100 | 100 |
| pH immediately after second NaOH addition | 11.0 | 10.78 | 10.89 |
| final pH | 10.5 | 10.1 | 10.5 |

These data show that the reaction mixture undergoes a sudden rise in pH due to the addition of NaOH. Because of the similarities between the polymerizations in Example 2 and the polymerization in Example 1, it is concluded that Example 1 showed the same increase in pH immediately after addition of NaOH, even though it was not directly measured in Example 1.

The data for rate (%/hr) versus extent (%) for Example 2 are shown below:

| Example 2-1 | | Example 2-2 | | Example 2-3 | |
| --- | --- | --- | --- | --- | --- |
| extent | rate | extent | rate | extent | rate |
| 21 | 15 | 26 | 17 | 15 | 13 |
| 42 | Add NaOH | 51 | Add NaOH | 31 | 21 |
| 47 | 45 | 56 | 26 | 32.5 | Add NaOH |
| 57 | 43 | 66 | 72 | 37 | 34 |
| 71 | 60 | 77 | 54 | 52 | 45 |
| 80 | 48 | | | 64 | 56 |
| | | | | 77 | 69 |

The polymerizations in Example 2 all show desirably high rates after the addition of NaOH.

EXAMPLE 3: NaOH ADDITION AT EXTENT OF 0%

Methods used for preparing the reaction mixture were the same as in Example 1. The materials and their proportions were as follows:

Droplet ingredients:

| Ingredient | amount[1] |
| --- | --- |
| Styrene | balance[2] |
| DVB | 10.2% |
| BPO | 0.3% |

Note
[1]% by weight based on the total weight of droplet ingredients.
Note
[2]to make up 100% by weight The ingredients intended for the aqueous liquid medium were as follows:

| Aqueous-Phase Ingredients | |
| --- | --- |
| ingredient | amount[3] |
| DI water | 100% |
| CMMC | 0.15% |
| PVOH | 0.06% |
| $NaNO_2$ | 0.025% |

Note
[3]% by weight based on the total weight of aqueous phase ingredients

The weight ratio of droplet ingredients to aqueous phase ingredients was 0.61:1.

Two polymerizations were performed, Example 3 and Comparative Example CB. The reaction mixtures were prepared identically. Then, prior to the beginning of polymerization, NaOH was added to Example 3 to establish pH of 10.8. Both reactions were heated to 72° C. and maintained there. No further additions of NaOH were made to either reaction. At the end of the procedure, pH was 5.5 for both reactions. Both reactions produced polymeric beads of harmonic mean size approximately 460 μm.

The extent of reaction versus time at 72° C. for each reaction was as follows:

| Extent (%) versus Time (hours) | | |
| --- | --- | --- |
| Time | Comparative Example CB | Example 3 |
| 0 | <5 | <5 |
| 1 | <5 | <5 |
| 2 | <5 | 5 |
| 3 | <5 | 10 |
| 4 | <5 | 17 |
| 5 | <5 | 22 |
| 6 | <5 | 32 |
| 7 | <5 | 45 |
| 8 | <5 | 58 |
| 14 | | 82 |
| 20 | 68 | |

Example 3 shows much higher extent of reaction after the first hour than does Comparative Example CB. This result demonstrates the effect that the addition of NaOH increases the polymerization rate.

EXAMPLE 4: POLYMERS WITHOUT DVB

Methods used for preparing the reaction mixture were the same as in Example 1. The materials and their proportions were as follows:

Droplet Ingredients

| Ingredient | amount[1] |
|---|---|
| Styrene | balance[2] |
| DVB | 0% |
| BPO | 0.5% |

Note
[1]% by weight based on the total weight of droplet ingredients.
Note
[2]to make up 100% by weight The ingredients intended for the aqueous liquid medium were as follows:

| Aqueous-Phase Ingredients | |
|---|---|
| ingredient | amount[3] |
| DI water | 100% |
| CMMC | 0.23% |
| PVOH | 0.06% |
| NaNO$_2$ | 0.11% |

Note
[3]% by weight based on the total weight of aqueous phase ingredients

The weight ratio of droplet ingredients to aqueous phase ingredients was 0.30:1.

Two polymerizations were conducted: Example 4 and Comparative Example CC. Method of polymerization was the same as in Example 1, with the differences in the extent at which NaOH was added shown along with the results below. Results are extent of reaction (%) and pH versus time at 80° C. (minutes):

| Extent versus time (minutes) | | | | |
|---|---|---|---|---|
| | Example 4 | | Comparative Example CC | |
| Time | Extent | pH | Extent | pH |
| 0 | 0% | 6.67 | 0% | 6.67 |
| 165 | 21% | | 23% | |
| 225 | 28% | | | |
| 285 | 34% | | 34% | |
| 345 | 42%[4] | 7.6 before | 43% | 7.36 |
| | | 11.38 after | | |
| 375 | 49% | | 45% | |
| 420 | | | 51% | |
| 435 | 58% | | | |
| 480 | | | 57% | |
| 495 | 67% | | | |
| 540 | | | 61% | |
| 555 | 86%[5] | 8.42 before | | |
| | | 11.24 after | | |
| 1500 | | 11.27 final | 73% | 7.90 |

Note
[4]215 ppm of NaOH added. The pH values shown are before and after addition of NaOH.
Note
[5]108 ppm of NaOH added. The pH values shown are before and after addition of NaOH.

In comparing Example 4 to Comparative Example CC, it can be seen that after the addition of NaOH at 345 minutes, Example 4 had consistently higher extent of reaction. This result demonstrates that the addition of NaOH caused an increase in the polymerization reaction rate of Example 4. Additionally, Comparative Example CC never progressed beyond an extent of the polymerization reaction of 73%, even after 1500 minutes, while Example 4 reached extent of 86% at 555 minutes.

EXAMPLE 5: EVOLVED GAS ANALYSIS OF COMPARATIVE EXAMPLE CD

In Comparative Example CD, droplet composition was the same as in Example 1. The ratio of droplet composition to aqueous phase was similar to Example 1. In Comparative Example CD, there was no PVOH and no CMMC. Gelatin was present in the aqueous phase. Sodium nitrite was present in the reaction mixture. Boric acid was present in the reaction mixture. Immediately prior to the beginning of polymerization, pH was approximately 10. The reaction mixture was formed at ambient conditions and then the temperature was raised to approximately 80° C. and held there until the reaction reached extent of over 85%. Once the temperature was raised and the polymerization reaction began, no adjustment was made to the pH. When the reaction was stopped, the pH was approximately 9.

The particles produced in Comparative Example CD were analyzed by the Evolved Gas method described above. No peak was found in the gas chromatography result. It is concluded that no nitrogen monoxide gas was evolved by Comparative Example CD.

EXAMPLE 6: EVOLVED GAS ANALYSIS OF COMPARATIVE EXAMPLE CE

Comparative Example CE was the same as Comparative Example CD except for the following differences: The amount of DVB in the droplet was 4.8% instead of 5%. No sodium nitrite was used. A dichromate salt was used as an additive to inhibit the progress of emulsion polymerization. As in Comparative example CD, no nitrogen monoxide was released from the dried polymer beads of Comparative Example CE.

EXAMPLE 7

Evolved gas analysis of the polymeric particles of Examples 2-1, 2-2, and 2-3. were analyzed as described in Example 5 and the results were as follows. The substance having retention time of 103 seconds in the gas chromatography was analyzed by mass spectrometry and verified as containing nitrogen monoxide by the same method as used for PVP, described above. This result demonstrates that the released substance either was nitrogen monoxide or else was a substance or mixture of substances that formed nitrogen monoxide after release from the polymeric particles.

Comparison of Example 7 to Comparative Examples CD and CE shows that the comparative examples had no releasable nitrogen monoxide, while the inventive example did have releasable nitrogen monoxide.

EXAMPLE 8: MASS SPECTROMETRY OF EXAMPLE 4

The polymerization process of Example 4 was conducted, and sample polymer was obtained at extent=20%. That sample polymer was separated using size exclusion chromatography to obtain a small sample having degree of polymerization of about 45. The small sample was tested by matrix-assisted laser desorption/ionization (MALDI) mass spectrometry (MS). Examination of the results from 4422 atomic mass units to 4440 atomic mass units showed a pattern of peaks that was consistent with a mixture of 0.4 mole of structure S1 for every one mole of structure S2, as follows:

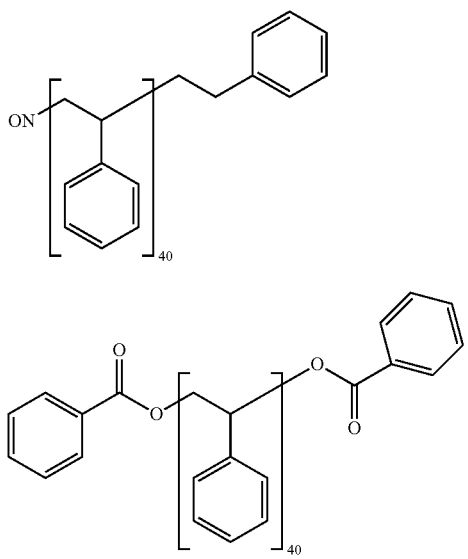

The results from the MALDI mass spectrometry are consistent with the presence of some polymer molecules that have covalently bound NO groups.

The invention claimed is:

1. A polymeric composition comprising polymeric particles and releasable nitrogen monoxide, wherein said polymeric particles comprise polymer, wherein the releasable nitrogen monoxide either is intimately mixed with said polymer or is in the form of —NO groups covalently bound to said polymer; wherein said polymeric particles have volume-average particle size of 0.05 mm to 1.5 mm, wherein said polymer is selected from the group consisting of (i) copolymers consisting of polymerized units of styrene and divinylbenzene, optionally comprising —NO groups covalently bound to said copolymer, (ii) ion exchange resins that are copolymers consisting of polymerized units of styrene and divinylbenzene that have been subjected to one or more chemical reactions to attach one or more ion exchange groups selected from the group consisting of sulfonic groups, carboxyl groups, tertiary amine groups, and quaternary amine groups, optionally comprising —NO groups covalently bound to said copolymer.

2. The polymeric composition of claim 1, wherein said releasable nitrogen monoxide is intimately mixed with said polymer.

3. The polymeric composition of claim 1, wherein the polymer is selected from the group consisting of copolymers consisting of polymerized units of styrene and divinylbenzene that have been subjected to one or more chemical reactions to attach one or more ion exchange groups selected from the group consisting of sulfonic groups, carboxyl groups, tertiary amine groups, and quaternary amine groups.

* * * * *